(No Model.)

E. R. MASON.
ADJUSTABLE AND DETACHABLE ARBOR FOR GRINDSTONES.

No. 282,546. Patented Aug. 7, 1883.

Witnesses:
H. A. Stoltenberg.
Chas. E. Adamson.

Inventor:
Edward R. Mason,
By Thomas G. Orwig,
Attorney.

UNITED STATES PATENT OFFICE.

EDWARD R. MASON, OF DES MOINES, IOWA.

ADJUSTABLE AND DETACHABLE ARBOR FOR GRINDSTONES.

SPECIFICATION forming part of Letters Patent No. 282,546, dated August 7, 1883.

Application filed June 6, 1883. (No model.)

*To all whom it may concern:*

Be it known that I, EDWARD R. MASON, of Des Moines, in the county of Polk and State of Iowa, have invented an Adjustable and Detachable Arbor for Grindstones, of which the following is a specification.

My invention relates to the manner of preparing grindstones for the market and mounting them for practical use.

Heretofore angular eyes have been formed in the centers of rough stones before placing them upon a mandrel to turn them, and an arbor had to be fitted and fixed in the angular eye of a stone before it could be trued and used.

My object is to provide an arbor that can be inserted in the eye of a grindstone (before the stone is finished and placed upon the market) and used as a mandrel for turning and truing the stone, and then detached to facilitate packing and shipping, and again applied at pleasure for mounting and operating the stone.

My improvement consists in providing an axle with an enlargement adapted to serve as a shoulder, and also as a clutch device, and in providing a sleeve having a flange at one end with a socket adapted to receive and engage the clutch device on the shaft, as hereinafter fully set forth, in such a manner that the two parts can be readily, detachably, and methodically combined with a grindstone to mount and rotate the stone, as required in turning, finishing, truing, and operating it.

Figure 1:
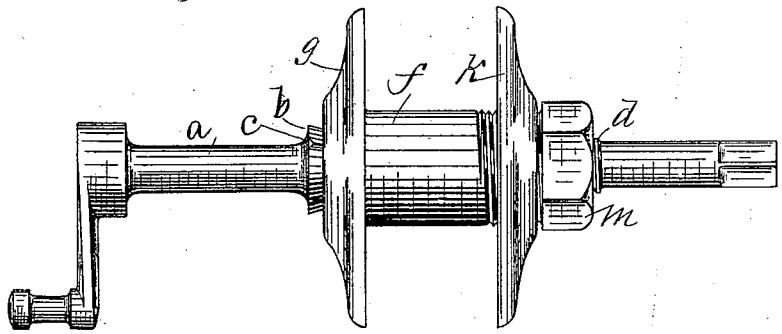
Figure 2:
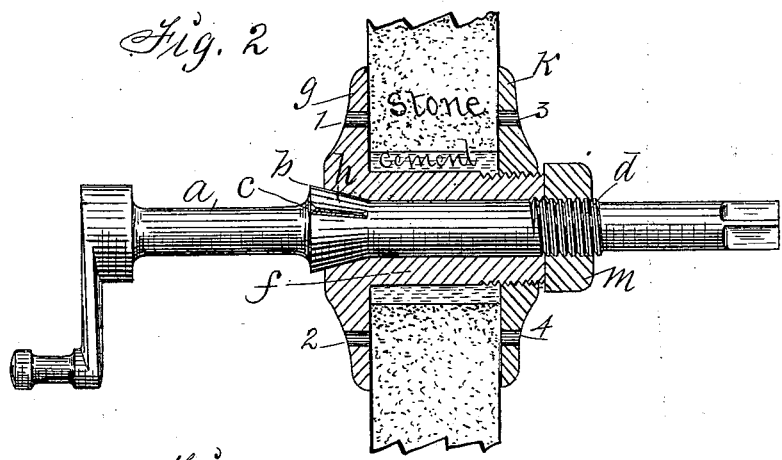
Figure 3:
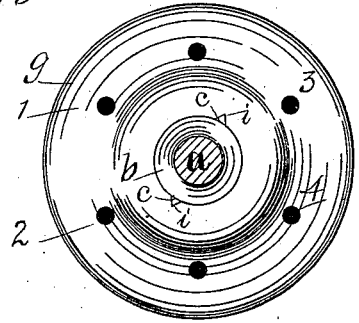

Figure 1 of my accompanying drawings shows my complete arbor, ready to be applied. Fig. 2 shows a half-section of the flanged sleeve and a half section of the adjustable disk re-removed and the clutch device uncovered, and a section of stone in which cement is filled in the angular eye and around the arbor. Fig. 3 is an end view of the flanged sleeve and transverse section of the axle combined to show the clutch device. Jointly considered these figures clearly illustrate the construction, application, and operation of my complete invention.

*a* represents an axle that may vary in size as required to suit grindstones of different diameters and weight.

*b* represents a shoulder and clutch device, formed on or fixed to the shaft or axle *a*. It may be made angular, but is preferably cone-shaped, and provided with projecting beads *c*, that perform the function of ratchet-teeth.

*d* is a screw-threaded section of the axle, so located relative to the fixed clutch device *b* that the screw-thread and clutch will be on opposite sides of a grindstone when the axle and complete arbor is inserted in the central eye of the stone.

*f* is a sleeve adapted to be fixed on the eye of a stone and to admit the axle *a*. It has an annular flange, *g*, at one end and a screw-thread on its opposite end.

*h* is an enlargement of the bore in the flanged end of the sleeve, that serves as a socket to receive and engage the clutch device on the axle *a*. It is provided with grooves *i*, that admit the beads or ratchet-teeth *e*, as required, to lock the sleeve and axle together, so that they will rotate jointly.

*k* is a disk corresponding in size with the fixed flange on the sleeve. It has a central screw-threaded bore, adapting it to be detachably and adjustably connected with the screw-threaded end of the sleeve.

*m* is a nut adapted to be slipped over the straight end of the axle to engage the screw-threaded section *d*, and to abut against the end of the sleeve *f*, as required, to prevent the sleeve from longitudinal movement relative to the clutch device *b*.

To apply my arbor to a rough unfinished grindstone having an angular eye in its center, I set the sleeve *h* on its flanged end upon a base having a concave to admit the flange, and then place the stone over it in such a manner that the sleeve will project through the center of the angular eye. I then fill cement in the eye and around the sleeve and place the disk *k* on the projecting screw-threaded end of the sleeve to clamp the stone and to cover and confine the cement until it is hardened and firmly fixed in the angular bore. I next pass the straight end of the axle *a* into the flanged end of the sleeve *f*, and push it through the sleeve until the shoulder and clutch *b* engages the socket *h* of corresponding form, and then place the nut *m* on the screw-threaded section *d* of the axle and draw it tightly against the end of the sleeve, to thereby lock all the parts together and to rigidly fix my complete arbor to the stone, so that the axle can be placed in bearings and the stone in a frame to be revolved, as required, to turn and finish and true it; and when thus finished and ready for market, and also ready for practical use, I detach the nut and withdraw the axle from the sleeve to economize space and promote convenience in packing and shipping. The cement, when hardened in the angular eye and around the sleeve, produces a bushed and round eye, into which my arbor can be readily inserted at any time and place, so that the axis of the arbor will be concentric with the finished periphery of the stone, and no truing required by the purchaser in mounting and preparing the stone for practical use.

Nos. 1 2 3 4 are perforations in the flange of the sleeve and disk to admit the prongs of a wrench.

I claim as my invention—

1. An improved arbor for grindstones, consisting of an axle having a fixed shoulder and clutch device and a screw-threaded section, a sleeve adapted to be fixed in the eye of a stone, and having the end of its bore shaped to engage the shoulder and clutch device on the axle, and a nut to engage the screw-threaded section of the axle and the end of the sleeve, for the purposes set forth.

2. The axle $a$, having a clutch device, $b$ $c$, and a screw-threaded section, $d$, the sleeve $f$, having a fixed flange, $g$, at one end and a screw-thread on its opposite end, and an enlargement, $h$, in the end of its bore, the disk $k$ and the nut $m$, arranged and combined relative to each other and a grindstone, substantially as shown and described, for the purposes specified.

3. The method of securing a sleeve centrally in the eye of a grindstone for the reception of a removable axle, which consists in the following steps: first, placing the sleeve with its flanges resting on a suitable base; second, placing the stone over the sleeve so that the sleeve will project through the center of the eye of the stone; third, filling the eye around the sleeve with cement; fourth, screwing down the clamping-disk on the projecting portion of the sleeve to cover and confine the cement until it hardens, substantially as and for the purpose specified.

EDWARD R. MASON.

Witnesses:
JOHN D. JORDAN,
WHITING S. CLARK.